Patented Feb. 20, 1934

1,947,837

UNITED STATES PATENT OFFICE 1,947,837

NEW ANILINE-SULPHONIC ACIDS

Erich Fischer, Bad Soden-on-the-Taunus, and Albert Kissling and Herbert Kracker, Frankfort-on-the-Main, Germany, assignors to General Aniline Works, Inc., New York, N. Y., a corporation of Delaware No Drawing. Application March 27, 1931, Serial No. 525,864, and in Germany April 4, 1930

6 Claims. (Cl. 260—129)

The present invention relates to new aniline-sulphonic acids, more particularly it relates to new compounds of the general formula:

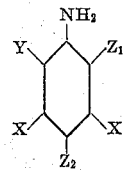

wherein $Z_1$ stands for hydrogen or X, $Z_2$ stands for X, but at least $Z_1$ or $Z_2$ stands for $SO_3H$, the X's represent substituents of the group consisting of halogen, alkyl, O-alkyl, $NO_2$, $SO_3H$ and COOH, and Y means hydrogen, alkyl or O-alkyl.

Our new substituted aniline-sulphonic acids are obtainable by causing a primary aromatic amine of the following general formula:

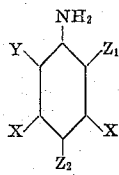

wherein $Z_1$ and $Z_2$ stand for hydrogen or X, but at least $Z_1$ or $Z_2$ stands for hydrogen, and the X's represent substituents of the group consisting of halogen, alkyl, O-alkyl, $NO_2$, $SO_3H$ and COOH, and Y means hydrogen, alkyl or O-alkyl, to react with a molecular proportion of a halogen sulphonic acid, advantageously in the presence of a diluent, moisture being excluded.

The sulphonation is preferably carried out at temperatures ranging from 150° C.–250° C. and occurs with very good yields.

We prefer to use as diluents, for instance, aliphatic hydrocarbons of high boiling point, their halogen substitution products, halogenated benzenes and toluenes, nitro-benzene or the like. The examples show how the diluent may be applied in the manufacture of the new compounds. It is of essential importance for obtaining a good yield that any trace of moisture is excluded during the sulphonation.

It could not be foreseen that it would be possible to sulphonate the compounds of the above mentioned kind because the sulphonic acid group has to take the place between two substituents. On account of "steric hindrance" it was rather possible that the reaction would fail (compare the statements in Houben-Weyl, vol. 3, ed. 2, page 995 and Berichte der deutschen chemischen Gesellschaft, vol. 50, page 1110).

In case the para-position to the amino-group is unsubstituted, the sulphonic acid group enters the para-position, if, however, the para-position is substituted, the sulphonic acid group enters the ortho-position to the amino group.

The new compounds form colorless crystalline powders which are soluble in water. They are valuable intermediate products for the synthesis of dyestuffs of various kinds.

The following examples serve to illustrate the invention, but they are not intended to limit it thereto, the parts being by weight:

(1) 196.5 parts of 3.4.5-trichloro-1-aminobenzene are dissolved in about 700 parts of carbon-tetra-chloride. After addition of dehydrated copper sulphate the solution is advantageously allowed to stand for about 12 hours so that even the smallest amount of water which might be present is removed. To the filtered solution there are added drop by drop within about half-an-hour 116.5 parts of chlorosulphonic acid while quickly stirring; for this purpose an apparatus is used which is provided with a reflux condenser and is protected as much as possible against the entrance of moisture. Stirring is continued for some time and the carbon tetrachloride is distilled off while simultaneously introducing about 2000 parts of ortho-dichlorobenzene and heating slowly until the interior temperature rises to 160° C.–170° C. During this operation it is advantageous to force or suck a current of dry air through the apparatus in order to remove quickly the hydrochloric acid which is eliminated. As soon as the current of air leaving the apparatus is free from hydrochloric acid, the reaction is finished.

The sulphonic acid can be isolated in one of the following manners: either the mixture is first filtered by suction, the residue is dissolved in water, the solution is rendered feebly alkaline and then distilled by means of steam, or the whole mixture is distilled by means of steam after having been rendered alkaline. The diluent can also be distilled off in a vacuum and the sulphuric acid then transformed into the sodium salt. From the filtered solution of the alkali salt the free 3.4.5-trichloro-1-amino-benzene-2-sulphonic acid of the following formula

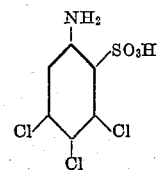

is then separated by means of a mineral acid. After it has been filtered by suction and dried, it is a colorless powder, which scarcely dissolves in water, easily dissolves in sodium carbonate, in the form of its sodium salt, and yields a diazo-compound scarcely soluble in water.

(2) 176 parts of 2.6-dichloro-4-amino-1-toluene are dissolved in about 2000 parts of ortho-dichlorobenzene. While vigorously stirring and well cooling 116.5 parts of chlorosulphonic acid are added drop by drop; stirring is continued for some time and the whole is then slowly heated to about 50° C. and subsequently the temperature is raised to 160° C.–170° C. Apparatus and conditions are the same as in Example 1.

The 2.6-dichloro-4-amino-1-toluene-3-sulphonic acid of the following formula

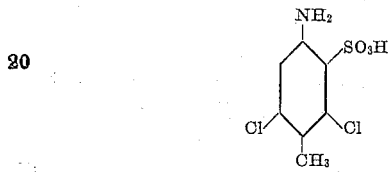

represents a colorless powder scarcely soluble in water. The sodium salt may be recrystallized from water in the form of white crystals.

(3) 190 parts of 4.6-dichloro-2-amino-1.3-xylene are dissolved in about 700 parts of carbon-tetrachloride and 116.5 parts of chloro-sulphonic acid are added drop by drop under the conditions stated in Example 1. In place of the carbon-tetrachloride distilled off, there is added technical chlorotoluene (boiling at about 156° C.). The thus obtained sulphonic acid of the following formula

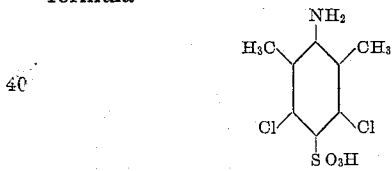

represents, after filtering by suction and drying, a colorless powder scarcely soluble in water, easily soluble in sodium carbonate, in the form of its sodium salt.

(4) By carrying out the operations described in the preceding examples with 121 parts of symmetrical meta-xylidine and 116.5 parts of chlorosulphonic acid, the xylidine sulphonic acid of the following formula

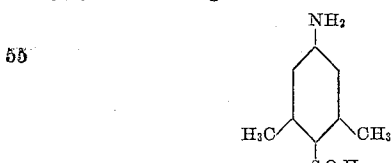

is obtained as colorless powder, soluble in water, easily soluble in sodium carbonate. The product can be recrystallized from water in the form of white needles.

(5) 166 parts of the nitro-xylidine of the following formula

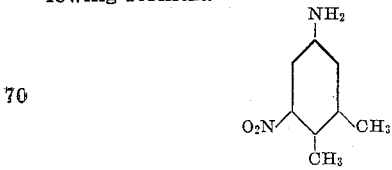

are dissolved in about 1500 parts of ortho-dichloro-benzene and sulphonated with 116.5 parts of chloro-sulphonic acid as described in Example 2. The sulphonic acid thus obtained which corresponds with the following formula

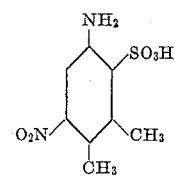

represents a colorless powder and may be recrystallized from water in the form of its sodium salt.

(6) 169.5 parts of the chloro-pseudo-cumidine of the following formula

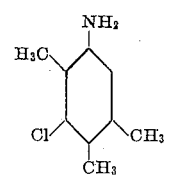

are dissolved in about 1500 parts of nitrobenzene and then sulphonated under the conditions given in Example 1 with 116.5 parts of chlorosulphonic acid while the temperature advantageously is not allowed to raise above 160° C.–170° C. The reaction product corresponding with the following formula

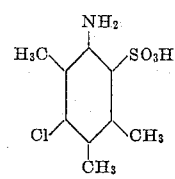

represents a colorless powder which is scarcely soluble in water and precipitates in the form of white crystals, for instance, by acidifying the hot solution of the sodium salt.

(7) 200 parts of bromo-xylidine of the following formula

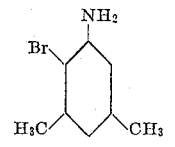

are transformed in a manner analogous to that described in Example 1 with 100 parts of fluoro-sulphonic acid into the sulphonic acid of the following formula

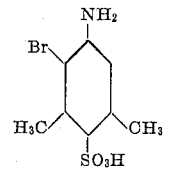

The sulphonic acid represents a colorless powder scarcely soluble in water. The more easily soluble sodium salt can be recrystallized from water whereby it is obtained in the form of white needles.

(8) By substituting for the amines mentioned in the preceding examples 2.4-dimethyl-3.5-dichloro-1-aminobenzene, there is obtained the 2.4- dimethyl-3.5-dichloro-1-aminobenzene-6-sulphonic acid of the following formula

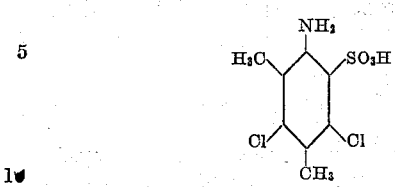

In an analogous manner there is obtained from 3.5-dichloro-1-aminobenzene the 3.5-dichloro-1-aminobenzene-4-sulphonic acid of the following formula

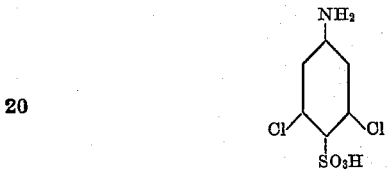

from 3-methoxy-5-chloro-1-aminobenzene the 3-methoxy-5-chloro-1-aminobenzene-4-sulphonic acid of the following formula

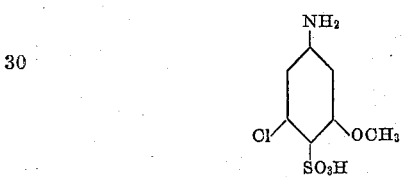

from 2-methoxy-3.5-dichloro-1-aminobenzene the 2-methoxy-3.5-dichloro-1-aminobenzene-4-sulphonic acid of the following formula

(9) 242 parts of 3.5-dichloraniline-4-sulphonic acid are finely ground with 1000 parts of tetrachlorethane to produce a suspension. This suspension is poured into the sulphonation apparatus and 100 parts of fluorosulphonic acid are added, and the whole is worked up under the conditions given in the preceding examples. There is obtained the disulphonic acid of the following formula

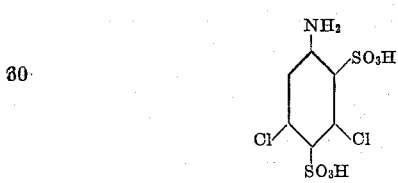

In this case the product is preferably worked up by stirring the filtered and dried material with cold water, whereby the whole of the disulphonic acid—which is very easily soluble in water—is dissolved; the scarcely soluble mono-potassium salt is subsequently precipitated by means of potassium chloride.

(10) 206 parts of 2.6-dichloro-4-amino-1-benzoic acid are transformed under the conditions described in the foregoing examples into the 2.6-dichloro-4-amino-3-sulpho-1-benzoic acid of the following formula

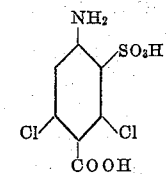

The sulphonic acid may be crystallized from water in the form of the mono-potassium salt and represents colorless crystals.

We claim:
1. The compounds of the following general formula:

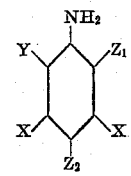

wherein the X's stand for halogen, alkyl, O-alkyl and $NO_2$, Y stands for hydrogen, alkyl or O-alkyl, $Z_1$ means $SO_3H$ and $Z_2$ a substituent of the group consisting of halogen, alkyl, $SO_3H$ and COOH or $Z_1$ represents a substituent of the group consisting of halogen, alkyl, O-alkyl and $Z_2$ means $SO_3H$, said products forming crystalline powders, soluble in water, 2. The compounds of the following general formula:

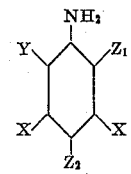

wherein the X's stand for halogen or alkyl, Y stands for hydrogen or alkyl, $Z_1$ means $-SO_3H$ and $Z_2$ a substituent of the group consisting of halogen, alkyl, $SO_3H$ and COOH, or $Z_1$ represents a substituent of the group consisting of halogen, alkyl and O-alkyl and $Z_2$ means $SO_3H$, said products forming crystalline powders, soluble in water.

3. The compounds of the following general formula:

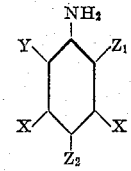

wherein the X's stand for Cl or $CH_3$, Y stands for hydrogen or $CH_3$, $Z_1$ means $SO_3H$ and $Z_2$ a substituent of the group consisting of Cl, $CH_3$, $SO_3H$ and COOH, or $Z_1$ represents a substituent of the group consisting of Br, $CH_3$ and $O-CH_3$, and $Z_2$ means $SO_3H$, said products forming crystalline powders, soluble in water.

4. The compound of the following formula:

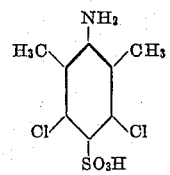

being a whitish powder, scarcely soluble in water, easily soluble in sodium carbonate in the form of its sodium salt.

5. The compound of the following formula

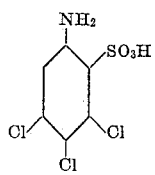

being a colorless crystalline powder, scarcely soluble in water, easily soluble in sodium carbonate in the form of its sodium salt.

6. The compound of the following formula

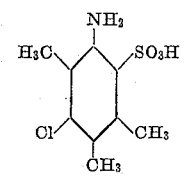

being a colorless crystalline powder, scarcely soluble in water, easily soluble in sodium carbonate in the form of its sodium salt.

ERICH FISCHER.
ALBERT KISSLING.
HERBERT KRACKER.